Oct. 19, 1965 F. P. FINLON ETAL 3,213,293

STABLE-LIMITED INPUT CIRCUIT FOR A BI-STABLE COMPARATOR

Filed July 6, 1961

FRANCIS P. FINLON
RALPH M. SEELEY, Jr.
INVENTORS.

BY
[signature]
ATTORNEYS

United States Patent Office 3,213,293
Patented Oct. 19, 1965

3,213,293

STABLE-LIMITED INPUT CIRCUIT FOR A BI-STABLE COMPARATOR

Francis P. Finlon, State College, and Ralph M. Seeley, Jr., Port Matilda, Pa., assignors, by mesne assignments, to the United States of America as represented by the Secretary of the Navy Filed July 6, 1961, Ser. No. 122,362
5 Claims. (Cl. 307—88.5)

This invention relates to devices for the comparison of two electrical potentials and in particular to amplitude comparators utilizing transistorized circuits.

In particular, this device is a diode limiter with a sharp voltage break-down characteristic (avalanche type) coupled to a conventional direct current amplifier which is designed to activate a conventional Schmitt trigger circuit. The Schmitt trigger circuit is adapted to give one indication when the input signal is above a certain predetermined set value of potential and a second indication when the input signal is below the set value. Such devices have great utility in analog-digital converters to determine when a voltage wave form has reached a predetermined amplitude.

It is an object of this invention, therefore, to provide a voltage comparison circuit capable of giving one indication when the input signal is above a certain predetermined potential level and a second indication when the input signal is below that level.

It is another object of this invention to provide a circuit having the ability to switch at high frequency.

There is still another object of this invention to provide a voltage comparison circuit that can be so biased that the comparison point can be changed.

These and other features and objects of this invention and the manner of obtaining them will be best understood by a reference to the following description taken in conjunction with the accompanying drawings, wherein.

Figure 1:
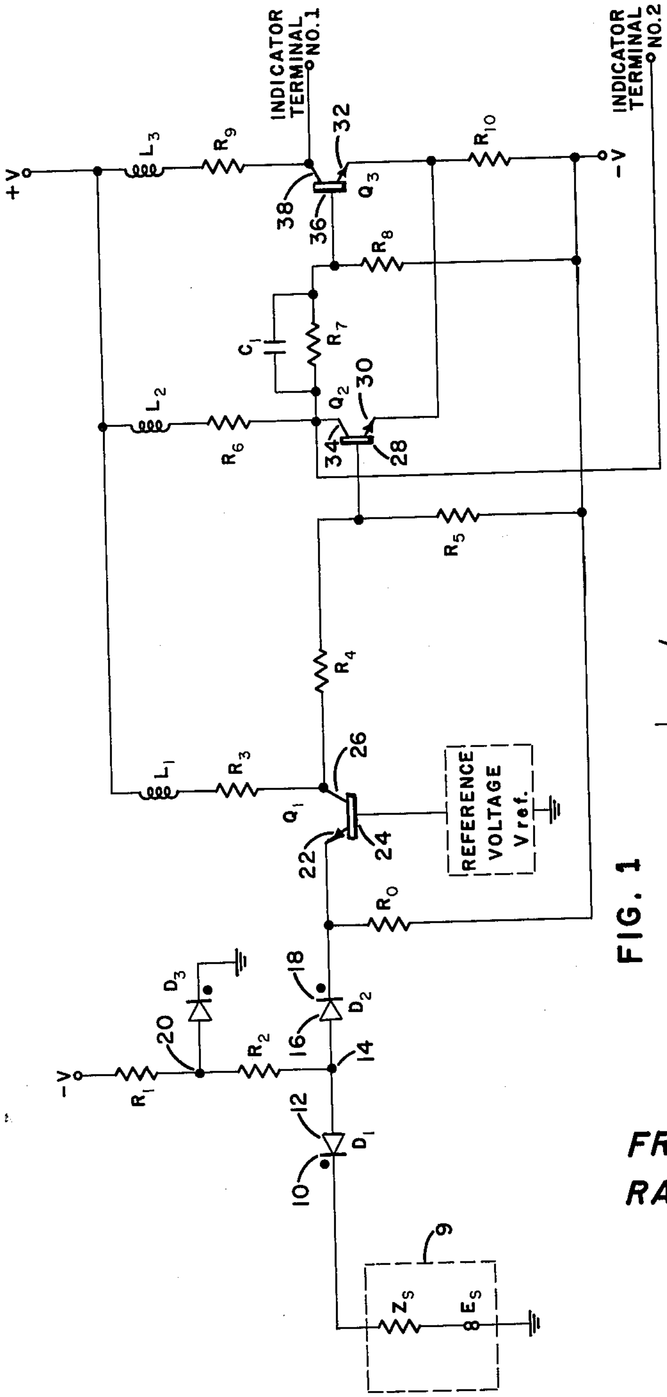
FIGURE 1 illustrates a circuit diagram of an embodiment of the voltage comparator involved in this invention.
Figure 2:
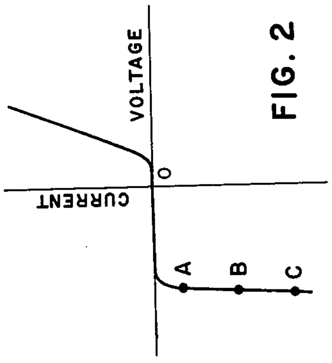
FIGURE 2 is a graph of the voltage-current characteristics of the avalanche-type diodes $D_1$ and $D_2$ of FIGURE 1.

Referring now to FIGURE 1, signal source 9, comprised of voltage signal $E_s$ and internal source impedance $Z_s$, is connected between ground and the cathode 10 of diode $D_1$. Anode 12 of diode $D_1$ is then connected through junction 14 to anode 16 of diode $D_2$, and from cathode 18 through the resistor $R_0$, to the power-source voltage —V. Diodes $D_1$ and $D_2$ are avalanche or breakdown asymmetrical conducting devices, having a very sharp breakdown voltage characteristic produced by majority carrier action as may be seen by reference to FIGURE 2, Diodes designated 1N756 to 1N759 are examples of this type. Junction 14 is connected to a source of constant current. Here the source is comprised of the series combination of resistor $R_2$ connected through junction 20 to resistor $R_1$ which is coupled to the power-source voltage —V. Diode $D_3$ is connected between junction 20 and ground, and is of the avalanche type adapted to maintaining a constant current of negative polarity to junction 14 in a manner well known in the art.

Cathode 18 is coupled to emitter 22 of NPN transistor $Q_1$ which with its accompanying circuit serves the function of a conventional amplifier. Base 24 of transistor $Q_1$ is coupled to the reference voltage $V_{ref}$ and to ground in such a manner that the operating characteristics of transistor $Q_1$ are controlled by the level of the voltage $V_{ref}$. In the remainder of this description, it will be assumed that reference voltage $V_{ref}$ is zero. However $V_{\alpha ef}$ may be any D.C. voltage constant of fluctuating. It should be understood, however, that the difference in voltage between the emitter-base voltage of the transistor $Q_1$ and other voltage levels may be used at will. The transfer function of transistor $Q_2$–$Q_3$ and its associated circuit constitute a hysteresis loop. Collector terminal 26 of transistor $Q_1$ is coupled through collector resistor $R_3$ and inductor $L_1$ to power-source voltage +V. Collector 26 is connected through coupling resistor $R_4$ to the base 28 of transistor $Q_2$. Transistor $Q_2$ in conjunction with transistor $Q_3$ operates as a conventional Schmitt trigger circuit.

This Schmitt trigger circuit as here used is the conventional regenerative bi-stable type whose state depends upon the amplitude of the input voltage. Base 28 is coupleted through base resistor $R_5$ to the power-source voltage —V. Emitter 30 of transistor $Q_2$ is connected to the emitter 32 of transistor $Q_3$ which is coupled through resistor $R_{10}$ to the power-source voltage —V. The collector terminal 34 of transistor $Q_2$ is coupled through collector resistor $R_6$, and inductor $L_2$ to power-source voltage +V and also to indicator terminal number 2 which, with indicator terminal number 1, serves to give final indication as to the behavior of signal source 9. Collector 34 is also coupled through parallel connected capacitor $C_1$ and resistor $R_7$ to the base 36 of transistor $Q_3$ which is also connected through resistor $R_8$ to power-source voltage —V. Collector terminal 38 of transistor $Q_3$ is coupled through collector resistor $R_9$ and inductor $L_3$ to power-source voltage +V and also to indicator terminal number 1. Inductors $L_1$, $L_2$ and $L_3$ serve as speed enhancing mechanisms whereby the indicator terminal outputs 1 and 2 have a more desirable voltage-time characteristic.

In operation, signal source 9, whose voltage amplitude is to be compared, may be considered to be fluctuating randomly. Reference voltage $V_{ref}$ is adjusted to produce the desired average comparison amplitude (defined at the center of the hysteresis; here assumed at ground potential) and a constant current is supplied to junction 14 in the manner previously described. Resistor $R_0$ is so adjusted that it will maintain sufficient current flow to ensure that some minimum operating current is always flowing through transistor $Q_1$. When the signal source 9 has a value of zero voltage, both diodes $D_1$ and $D_2$ can be considered to be conducting in a breakdown manner as indicated by point A, FIGURE 2. In this state, each diode is conducting one-half of the total current determined by the formula $$\frac{V_1 - E_d}{R_2}$$

where $E_d$ is the breakdown voltage of the two (similar) diodes $D_1$ and $D_2$. When the voltage of signal source 9 becomes positive, more current flows from the junction 14 through diode $D_1$ and less through diode $D_2$. The direction of this change is to cause a smaller voltage drop across diode $D_2$ thus tending to move it out of its breakdown region to point B, FIGURE 2, while diode $D_1$ operates further in its breakdown region at point C. Therefore, the current through diode $D_2$ is noticeably reduced. The lessening of current flow through diode $D_2$, of course, reduces the current flowing through emitter 22, collector 26 of transistor $Q_1$ and through resistor $R_3$. The current change in the diode $D_2$ flows predominately in the emitter 22 of transistor $Q_1$ producing a collector current $\alpha$ times the emitter current, where $\alpha$, the current amplification factor is very close to 1. The reduced current flow through resistor $R_3$ results in a consequent voltage increase at collector terminal 26. This voltage increase is transmitted through resistor $R_4$ to base 28 of transistor $Q_2$ which triggers a greater current flow through collector terminal 34 and resistor $R_6$. The increased current through resistor $R_6$ results in increased voltage drop and a decreased voltage at collector 34. Connected indicator terminal number 2 thus decreases in voltage, indicating instantly that signal source 9 has risen above the preset reference voltage level.

This decrease in voltage at collector terminal 34 is transmitted through resistor $R_7$ and capacitor $C_1$ to base terminal 36 of transistor $Q_3$ which is out of phase with transistor $Q_2$, in a manner well known in the art. Thus the decrease in the voltage value at base 36 causes triggering, a voltage increase at collector terminal 38 and indicator terminal number 1. Thus as may be seen, transistors $Q_2$ and $Q_3$ operating as a conventional Schmitt trigger circuit produce an increasing voltage signal at indicator terminal number 1 and a decreasing one at indicator terminal number 2 when the signal source becomes positive. When the signal source 9 becomes negative, a result opposite to that previously described occurs and the voltage at indicator terminal 1 decreases while that at indicator terminal number 2 increases.

The design of this device is nearly independent of impedance $Z_s$, as long as $Z_s$ is relatively small, i.e., no larger than the input impedance of the device. The voltage hysteresis at the device's input is proportional to the dynamic impedance of the avalanche diodes around point B plus the dynamic impedance of the emitter circuit of transistor $Q_1$.

The value of the reference voltage may be set to any level relative to ground. The reference voltage can be produced by voltage across semiconductor diodes, in a manner well known in the art, so as to compensate for the emitter base voltage vs. temperature characteristic of the transistor $Q_1$. Diodes $D_1$ and $D_2$, being similar diodes in most cases, also compensate or balance each other. Thus the device can easily be made to have a temperature characteristic smaller than the static hysteresis. The exact value of the comparison point is determined also by the relative breakdown voltages of diodes $D_1$ and $D_2$. If desired, the two diodes could have quite dissimilar breakdown voltages, in which case the comparison voltage would be at the value $[E_{D_1}-E_{D_2}]$, the breakdown voltages of the respective diodes. This difference in breakdown voltages may be positive or negative. The maximum operating frequency of the device is primarily dependent on the frequency characteristics of transistor $Q_1$.

To illustrate the performance of the device, the apparent input hysteresis was measured at one kilocycle with a certain small input level. The measured value was 10 millivolts. At 100 kilocycles with the same input level, the hysteresis was 115 millivolts. From this data it was concluded that the static hysteresis was less than 10 millivolts and the apparent dynamic hysteresis was caused by the constant time delay of the sensing circuit following the breakdown of diodes $D_1$ and $D_2$, in this case one microsecond.

It may be seen in this device that it is necessary to use breakdown diodes of sufficiently high voltage (generally above 8 volts) that a sharp breakdown characteristic is obtained, as a sensitivity of the circuit is dependent on this characteristic. In addition, with some diodes, advantage can be taken of a negative resistance region appearing at small breakdown currents in the static voltage-current characteristic. If the constant current through the resistor $R_2$ is made somewhat greater than twice the value of the highest current in the negative resistance region mentioned above, then effectively sharper breakdown is obtained. In addition, there will be no troublesome oscillations due to such a negative resistance region.

While we have described the principles of our invention in its connection with a specific apparatus, it is to be clearly understood that this description is made only by way of example and not as a limitation to the scope of the invention. What is claimed is:

1. A voltage comparator circuit consisting of, in combination: a first and a second asymmetrical conducting device having like electrode terminals connected at a common junction source of constant current; a source of signal voltage connected to the unlike electrode terminal of the first of said devices; a sensing amplifier connected to the unlike terminal of the second of said devices said sensing amplifier having a D.C. reference voltage source coupled to the control terminal thereof; a bi-stable circuit connected to said sensing amplifier adapted to give one output indication when said source of signal voltage goes below said reference voltage and another when said source of signal voltage rises above said reference voltage.

2. The combination as claimed in claim 1 in which the asymmetrical conducting devices are comprised of diodes having sharp reverse breakdown characteristics.

3. The combination as claimed in claim 2 which said sensing amplifier is a transistorized amplifier.

4. The combination as claimed in claim 3 in which said bi-stable circuit is a Schmitt trigger circuit.

5. The combination as claimed in claim 4 in which said source of constant current is produced by a constant direct current voltage source in series with a large resistor.

References Cited by the Examiner

UNITED STATES PATENTS

| | | | |
|---|---|---|---|
| 2,777,956 | 1/57 | Kretzmer | 307—88.5 |
| 2,851,638 | 9/58 | Wittenberg et al. | 307—88.5 |
| 2,909,676 | 10/59 | Thomas | 307—88.5 |
| 2,986,652 | 5/61 | Eachus | 307—88.5 |
| 3,095,541 | 6/63 | Ashcraft | 307—88.5 |

ARTHUR GAUSS, *Primary Examiner.*

JOHN W. HUCKERT, *Examiner.*